United States Patent
Bowyer et al.

(10) Patent No.: US 11,203,344 B2
(45) Date of Patent: Dec. 21, 2021

(54) COURTEOUS TRAJECTORY PLANNING FOR AUTOMATED VEHICLES

(71) Applicant: Robert Bosch GmbH, Stuttgart (DE)

(72) Inventors: Michael John Bowyer, Rochester Hills, MI (US); Benjamin Thomas Nuttle, Glendale, AZ (US)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 16/867,203

(22) Filed: May 5, 2020

(65) Prior Publication Data
US 2021/0347362 A1 Nov. 11, 2021

(51) Int. Cl.
| | |
|---|---|
| *B60W 30/18* | (2012.01) |
| *B60W 60/00* | (2020.01) |
| *B60W 40/04* | (2006.01) |
| *G06K 9/00* | (2006.01) |

(52) U.S. Cl.
CPC ...... *B60W 30/18163* (2013.01); *B60W 40/04* (2013.01); *B60W 60/00274* (2020.02); *G06K 9/00791* (2013.01); *B60W 2554/406* (2020.02); *B60W 2554/4045* (2020.02); *B60W 2754/10* (2020.02)

(58) Field of Classification Search
None
See application file for complete search history.

(56) References Cited

U.S. PATENT DOCUMENTS

| | | |
|---|---|---|
| 9,159,023 B2 | 10/2015 | Bone et al. |
| 9,669,872 B2 | 6/2017 | Rebhan et al. |
| 10,240,941 B2 | 3/2019 | Okada et al. |

(Continued)

FOREIGN PATENT DOCUMENTS

| | | | |
|---|---|---|---|
| CN | 110083153 A | * | 8/2019 |
| CN | 110979330 A | * | 4/2020 |
| CN | 111024107 A | * | 4/2020 |

OTHER PUBLICATIONS

Huang Yongbin; Machine translation of CN-110083153-A; Aug. 2019; espacenet.com (Year: 2019).*

(Continued)

*Primary Examiner* — David P. Merlino
(74) *Attorney, Agent, or Firm* — Michael Best & Friedrich LLP

(57) ABSTRACT

Systems and methods for driving trajectory planning of an automated vehicle. The system includes an electronic processor configured to determine a lane segment graph indicating allowable transitions between a plurality of lane segments. The electronic processor is also configured to determine a current type of traffic flow situation. The electronic processor is further configured to determine weighting factors for each of the allowable transitions based on aggregate observations of previous real-world traffic flow transitions for the current type of traffic flow situation. Each of the weighting factors indicate a likelihood of transition for a respective one of the allowable transitions. The electronic processor is also configured to determine a weighted lane segment graph based at least in part on the weighting factors. The electronic processor is further configured to determine a driving trajectory of the automated vehicle based at least in part on the weighted lane segment graph.

20 Claims, 9 Drawing Sheets

(56) References Cited

U.S. PATENT DOCUMENTS

| | | |
|---|---|---|
| 10,388,166 B2 | 8/2019 | Takeda |
| 2017/0227966 A1* | 8/2017 | Monzen ............. B62D 15/0255 |
| 2018/0339708 A1 | 11/2018 | Geller |
| 2019/0077398 A1 | 3/2019 | Kusano et al. |
| 2020/0172106 A1* | 6/2020 | O'Dea .................. B60W 30/12 |
| 2021/0284162 A1* | 9/2021 | Parks .................... B60W 40/04 |

OTHER PUBLICATIONS

Chu Wenbo; Machine translation of CN-111024107-A; Apr. 2020;espacenet.com (Year: 2020).*

Cao Runzi; Machine translation of CN-110979330-A; Apr. 2020; espacenet.com (Year: 2020).*

* cited by examiner

COURTEOUS TRAJECTORY PLANNING FOR AUTOMATED VEHICLES

FIELD

The disclosure relates generally to automated driving systems. More specifically, the disclosure relates to courteous tactical reasoning in automated driving systems.

BACKGROUND

Tactical reasoning enables automated driving systems to navigate through complex traffic situations on the road. As automation increases, automated driving systems face correspondingly tougher challenges and must therefore be able to react appropriately to a variety of situations. Automated vehicles must adhere to existing traffic laws, although following traffic laws alone may not be sufficient for comfortable driving expected by passengers.

SUMMARY

Human drivers frequently adopt unspoken rules of common courtesy to determine which lane on a road to occupy in order to provide a more comfortable commute. For example, most countries have a notion of an overtaking lane and a slow lane when driving on highways. Human drivers who continually occupy the overtaking lane are considered rude. An automated driving system which does not adhere to unspoken rules of politeness like this may cause undue distress and annoyance to end-users. Another example of this is the notion of yielding via changing lanes to provide space to a vehicle entering a highway. Without some notion that it should be courteous to another driver, an automated driving system has no inherent reason to respect these conventions and therefore may behave strangely by conventional standards. Aside from causing stress for users of the automated driving system, failure to yield in driving situations like this could cause stress to human drivers of other vehicles on the road who may incorrectly anticipate a polite driver.

Robust prediction of other drivers' intent when driving on roadways is another challenge facing automated driving systems. Robust prediction greatly assists automated driving systems to behave consistently and cooperatively with other traffic participants throughout driving tasks. Human drivers intuitively reason the actions other drivers are likely to execute based on contextual knowledge and indicators from other traffic participants. Analogous reasoning assists automated driving systems to model human behavior suitably and navigate comfortably in complex traffic scenes. Current automated vehicles utilize obvious intent clues such as turn indicators observed from a driving scene to accomplish this task. Augmenting current approaches with additional contextual information improves the accuracy of an automated driving system's prediction of other traffic participants to a level closer to human drivers.

Thus, the disclosure provides a system for driving trajectory planning of an automated vehicle. In one implementation, the system includes an electronic processor. The electronic processor is configured to determine a lane segment graph indicating allowable transitions between a plurality of lane segments. The electronic processor is also configured to determine a current type of traffic flow situation. The electronic processor is further configured to determine weighting factors for each of the allowable transitions based on aggregate observations of previous real-world traffic flow transitions for the current type of traffic flow situation. Each of the weighting factors indicate a likelihood of transition for a respective one of the allowable transitions. The electronic processor is also configured to determine a weighted lane segment graph based at least in part on the weighting factors. The electronic processor is further configured to determine a driving trajectory of the automated vehicle based at least in part on the weighted lane segment graph. In some implementations, the electronic processor is also configured to determine a predicted trajectory on a neighboring vehicle based at least in part on the weight lane segment graph.

The disclosure also provides a method for driving trajectory planning of an automated vehicle. The method includes determining, with an electronic processor, a lane segment graph indicating allowable transitions between a plurality of lane segments. The method also includes determining, with the electronic processor, a current type of traffic flow situation. The method further includes determining, with the electronic processor, weighting factors for each of the allowable transitions based on aggregate observations of previous real-world traffic flow transitions for the current type of traffic flow situation. Each of the weighting factors indicate a likelihood of transition for a respective one of the allowable transitions. The method also includes determining, with the electronic processor, a weighted lane segment graph based at least in part on the weighting factors. The method further includes determining, with the electronic processor, a driving trajectory of the automated vehicle based at least in part on the weighted lane segment graph. In some implementations, the method also includes determining, with the electronic processor, a predicted trajectory of a neighboring vehicle based at least in part on the weight lane segment graph.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

Figure 1:
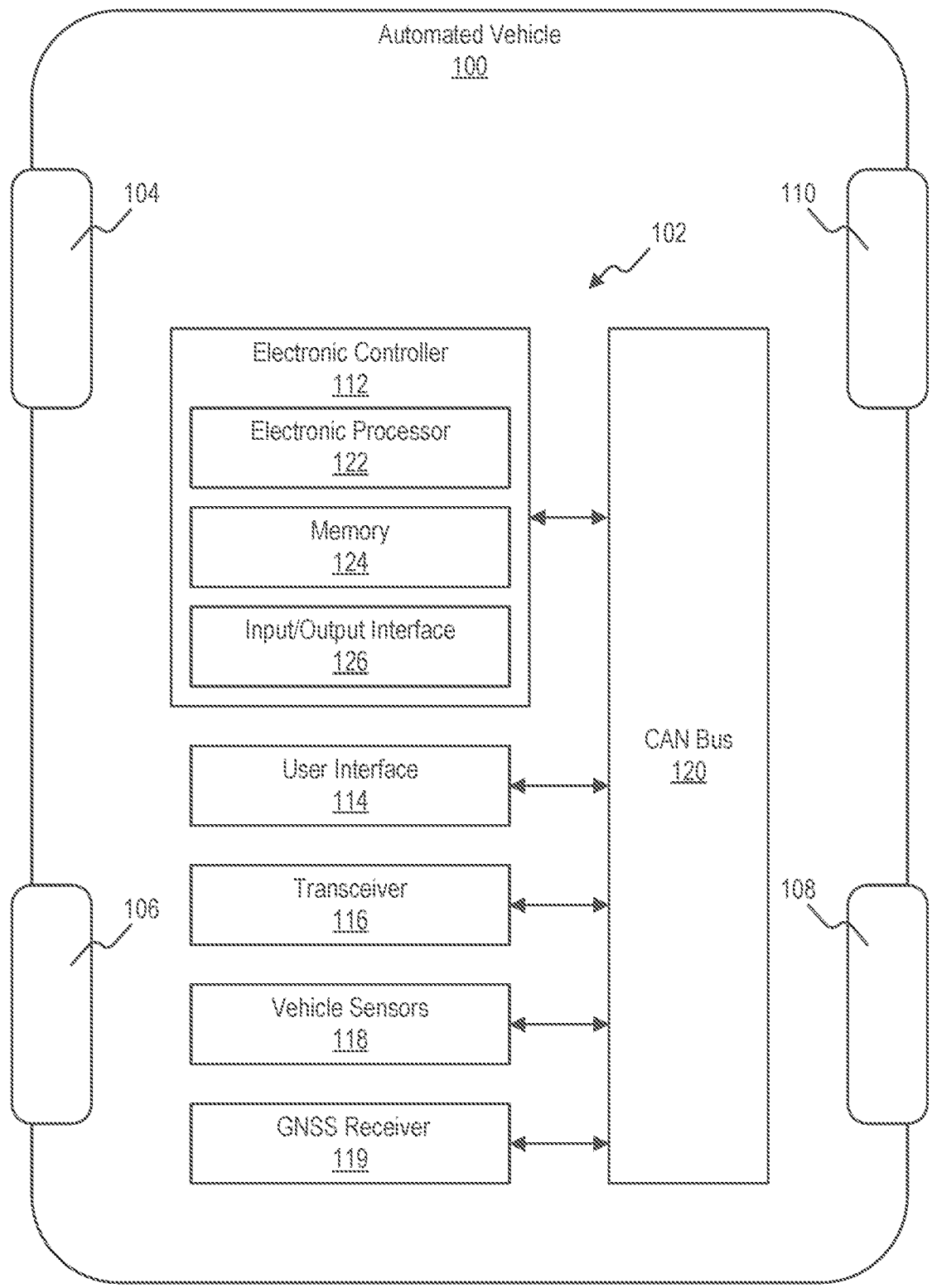
FIG. 1 is a block diagram of one example an automated vehicle equipped with a system for driving trajectory planning, in accordance with some implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

FIG. 1 is a block diagram of one example of an automated vehicle 100 equipped with a system 102 for driving trajectory planning. The automated vehicle 100 illustrated in FIG. 1 is an automobile that includes four wheels 104, 106, 108, and 110. In some implementations, the system 102 is equipped to a vehicle with more or less than four wheels. For example, the system 102 may be equipped to a motorcycle, a truck, a bus, a trailer, and the like. In practice, the automated vehicle 100 includes additional components such as a propulsion system, a steering system, a braking system, and the like. For ease of explanation, these additional components are not illustrated here.

The system 102 illustrated in FIG. 1 includes an electronic controller 112 (for example, an electronic control unit), a user interface 114, a transceiver 116, one or more vehicle sensors 118, a GNSS (global navigation satellite system) receiver 119, and a controller area network bus (for example, CAN bus 120). In some implementations, the system 102 includes fewer or additional components in configurations different from the one illustrated in FIG. 1. For example, in practice, the system 102 may include additional components such as driving systems, and the like. For ease of explanation, these additional components are not illustrated here. In some implementations, the system 102 is wholly or partially contained within the automated vehicle 100.

The electronic controller 112 illustrated in FIG. 1 includes an electronic processor 122 (for example, one or more microprocessors, application-specific integrated circuits (ASICs), systems-on-a-chip (SoCs), or other electronic controllers), memory 124, and an input/output interface 126. The components included in the electronic controller 112 are coupled to each other via one or more buses (not shown). The memory 124 includes, for example, read only memory (ROM), random access memory (RAM), an electrically erasable programmable read-only memory (EEPROM), other non-transitory computer-readable media, or a combination thereof. In some implementations, the memory 124 is included in the electronic processor 122. The electronic processor 122 is configured to retrieve computer-readable instructions and data from the memory 124 and execute the computer-readable instructions to perform the functionality and methods described herein. The input/output interface 126 includes routines for transferring data between components within the electronic controller 112 and components external to the electronic controller 112. The input/output interface 126 is configured to transmit and receive data via one or more wired couplings (for example, wires, optical fiber, and the like), wirelessly, or a combination thereof. For example, the input/output interface 126 is configured to transmit and receive data via one or more wired couplings to the CAN bus 120.

The user interface 114 includes, for example, one or more input mechanisms (for example, a touch screen, a keypad, a button, a knob, and the like), one or more output mechanisms (for example, a display, a speaker, and the like), or a combination thereof. In some implementations, the user interface 114 includes a touch-sensitive interface (for example, a touch-screen display) that displays visual output generated by software applications executed by the electronic processor 122. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 114 is separated from the system 102.

The transceiver 116 includes routines for transferring information between components within the system 102 and components external to the system 102. The transceiver 116 is configured to transmit and receive signals wirelessly using, for example, Wi-Fi, Bluetooth, cellular networks, telematic networks, and the like. In some implementations, the transceiver 116 is further configured to transmit and receive signals via one or more wired couplings (for example, wires, optical fiber, and the like).

The one or more vehicle sensors 118 are physically coupled to the automated vehicle 100 and are configured to capture, among other things, position data of neighboring vehicles. The one or more vehicle sensors 118 include, for example, visual sensors, radar sensors, ultrasonic sensors, LIDAR sensors, and the like. In some implementations, the one or vehicle sensors 118 include a camera (for example, a video camera and/or a photographic camera) that is physically coupled to a component of the automated vehicle 100 facing in the direction of forward driving (for example, a front bumper, a hood, a rear-view mirror, and the like). The camera is configured to capture roadway scene images of the surroundings of the automated vehicle 100 (for example, a traffic scene). The camera is configured to transmit the captured roadway scene images to the electronic controller 112.

The GNSS (global navigation satellite system) receiver 119 receives radio-frequency signals from orbiting satellites using one or more antennas and receivers (not shown). The GNSS receiver 119 determines geo-spatial positioning (i.e., latitude, longitude, altitude, and speed) for the automated vehicle 100 based on the received radio-frequency signals. The GNSS receiver 119 communicates this positioning information to the electronic controller 112. The electronic controller 112 may use this information in conjunction with or in place of information received from the vehicle sensors 118 when controlling the automated vehicle 100. The electronic controller 112 may also utilize information received by the GNSS receiver 119 to plan routes and navigate the automated vehicle 100. GNSS receivers are known and will not be described in greater detail. In some implementations, the GNSS receiver 119 may operate using the GPS (global positioning system). Alternative implementations may use a regional satellite navigation system, and/or a land-based navigation system in conjunction with or in place of the GNSS receiver 119.

Figure 2:
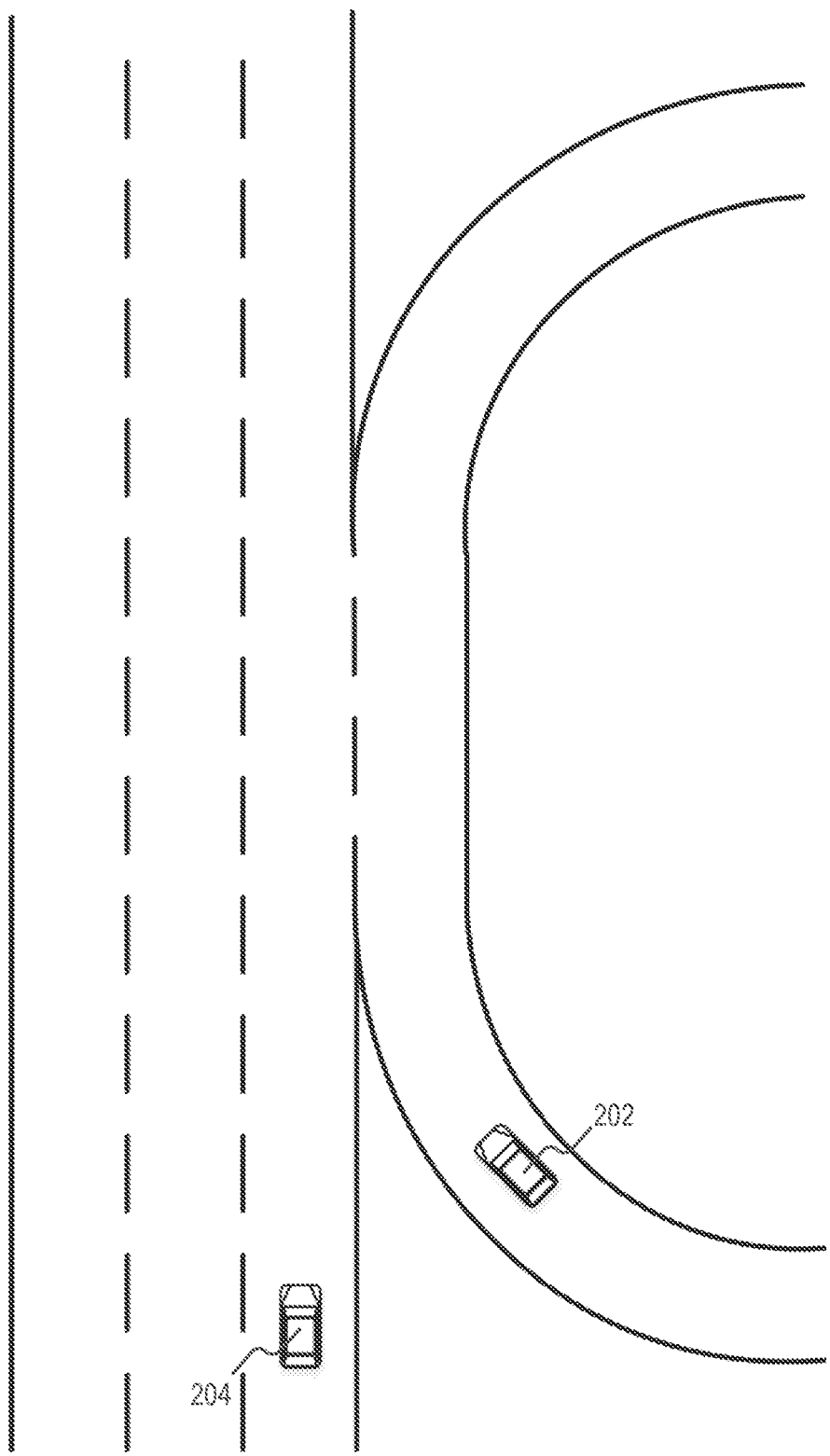
FIG. 2 is a diagram of one example of a driving scene in which a first vehicle is on an entrance ramp of a highway and a second vehicle is approaching the ramp in the rightmost lane.
Figure 3:
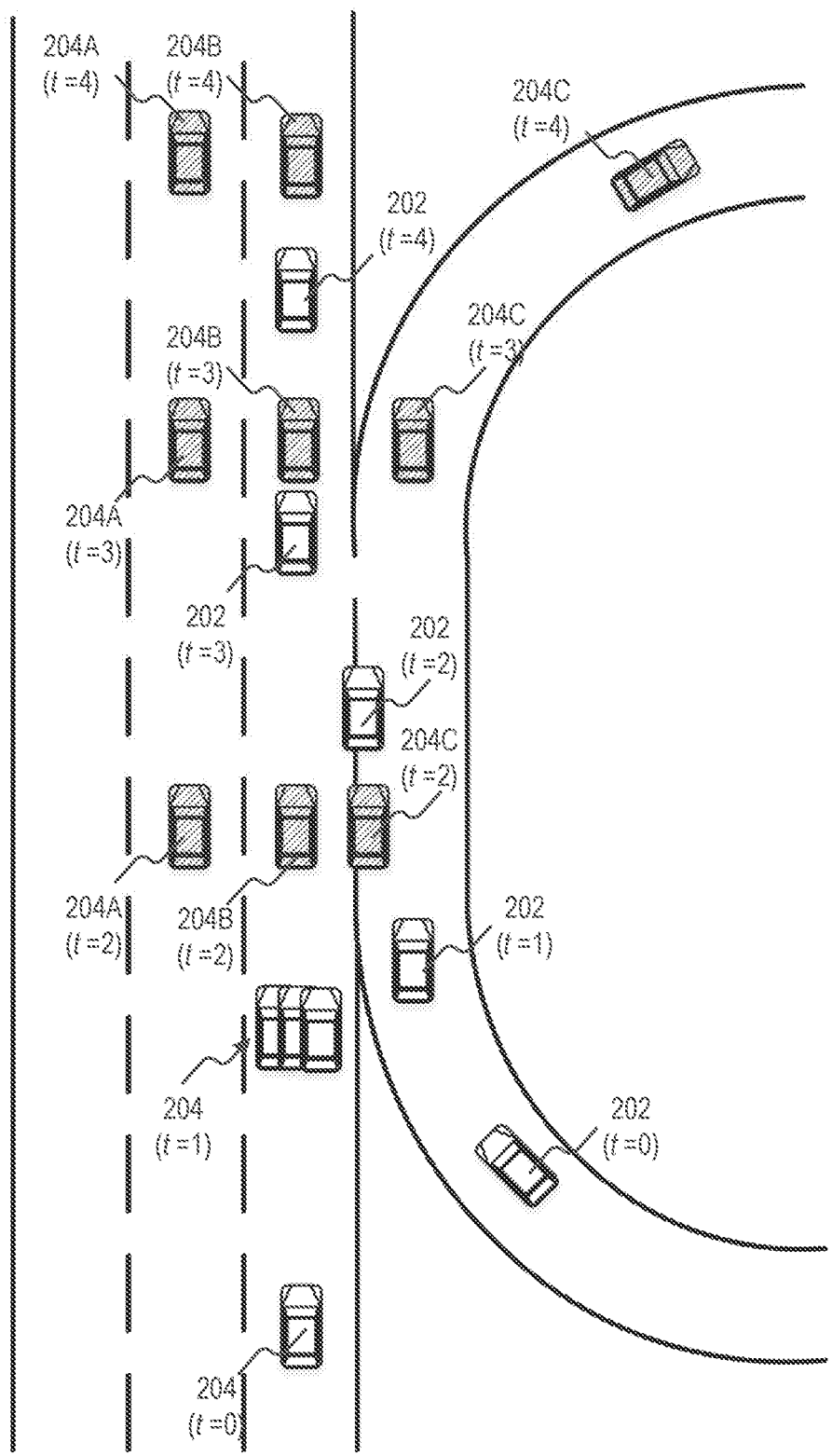
FIG. 3 is a diagram of one example of a predicted evolution of the driving scene illustrated in FIG. 2.

FIG. 2 is one example of a driving scene. In the driving scene illustrated in FIG. 2, a first vehicle 202 is on an entrance ramp of a highway and a second vehicle 204 is approaching the ramp in the rightmost lane. FIG. 3 is one example of a predicted evolution of the driving scene illustrated in FIG. 2 from the perspective of the first vehicle 202. The first vehicle 202 predicts future states of both the first vehicle 202 and the second vehicle 204. The first vehicle 202 is in control of its own movement and in this case is only considering one path (i.e., merging into the next lane). However, the first vehicle 202 is unable to control the movement of the second vehicle 204, and thus predicts all potential end states for the second vehicle 204 in the future. The t=n portion of the reference labels in FIG. 3 represent the states of the first vehicle 202 and the second vehicle 204 at future time n. As illustrated in FIG. 3, the second vehicle 204 has numerous potential paths which result in three resultant states which are indicated by reference characters 204A, 204B, and 204C, respectively. The uncertainty of the state of the second vehicle 204 is illustrated in FIG. 3 by shading, with shading indicating low confidence in the predicted state and the lack of shading indicating high confidence in the predicted state. As illustrated in FIG. 3, each possible future state of the second vehicle 204 is just as likely as the other states. Some current systems use perceived clues (for example, turn indicators) to determine the most likely next course of action for the second vehicle 204. However, current systems have no contextual knowledge of what other vehicles are likely do to a priori. This leads to all possible end states for the second vehicle 204 being equally likely from the perspective of the first vehicle 202 because current systems rely on real-time observations alone to deduce the likely intent.

Figure 4:
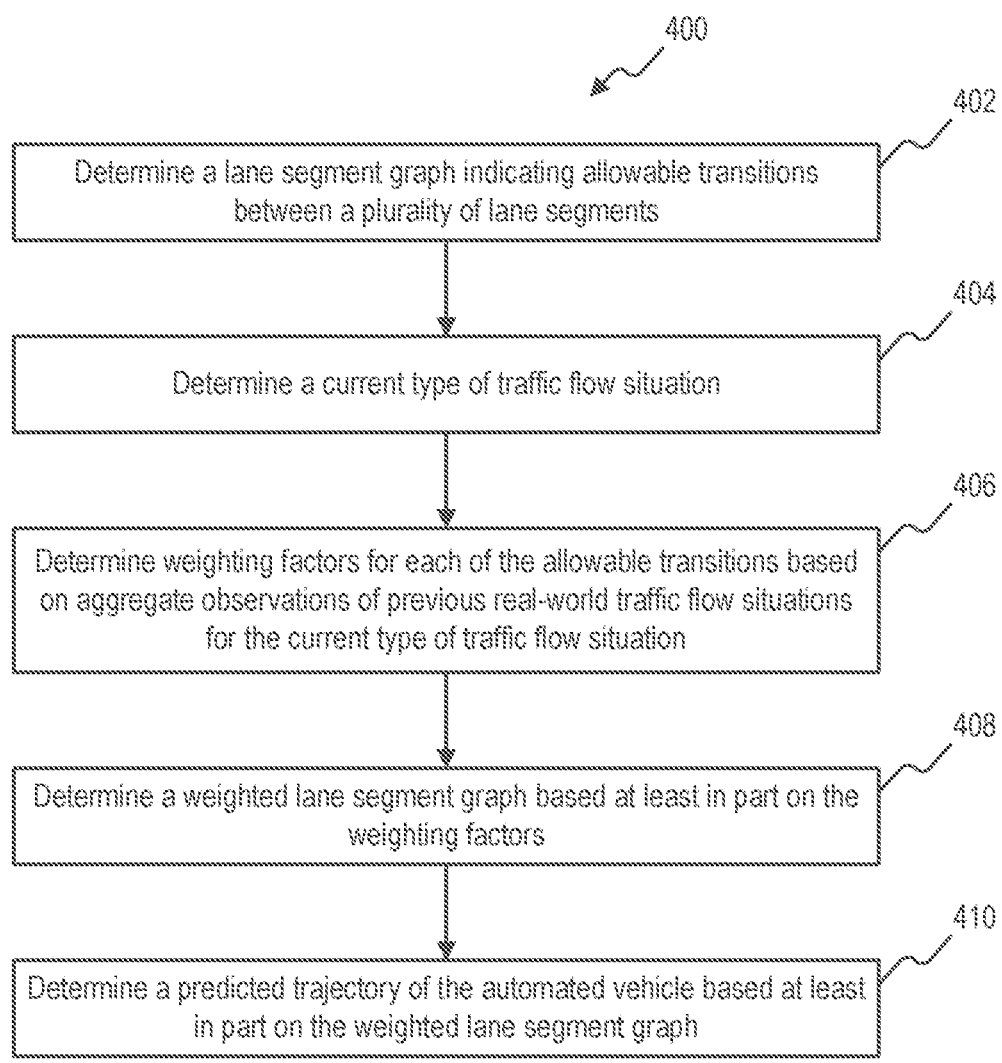
FIG. 4 is flow diagram of one example of a method for driving trajectory planning of an automated vehicle, in accordance with some implementations.
Figure 5:
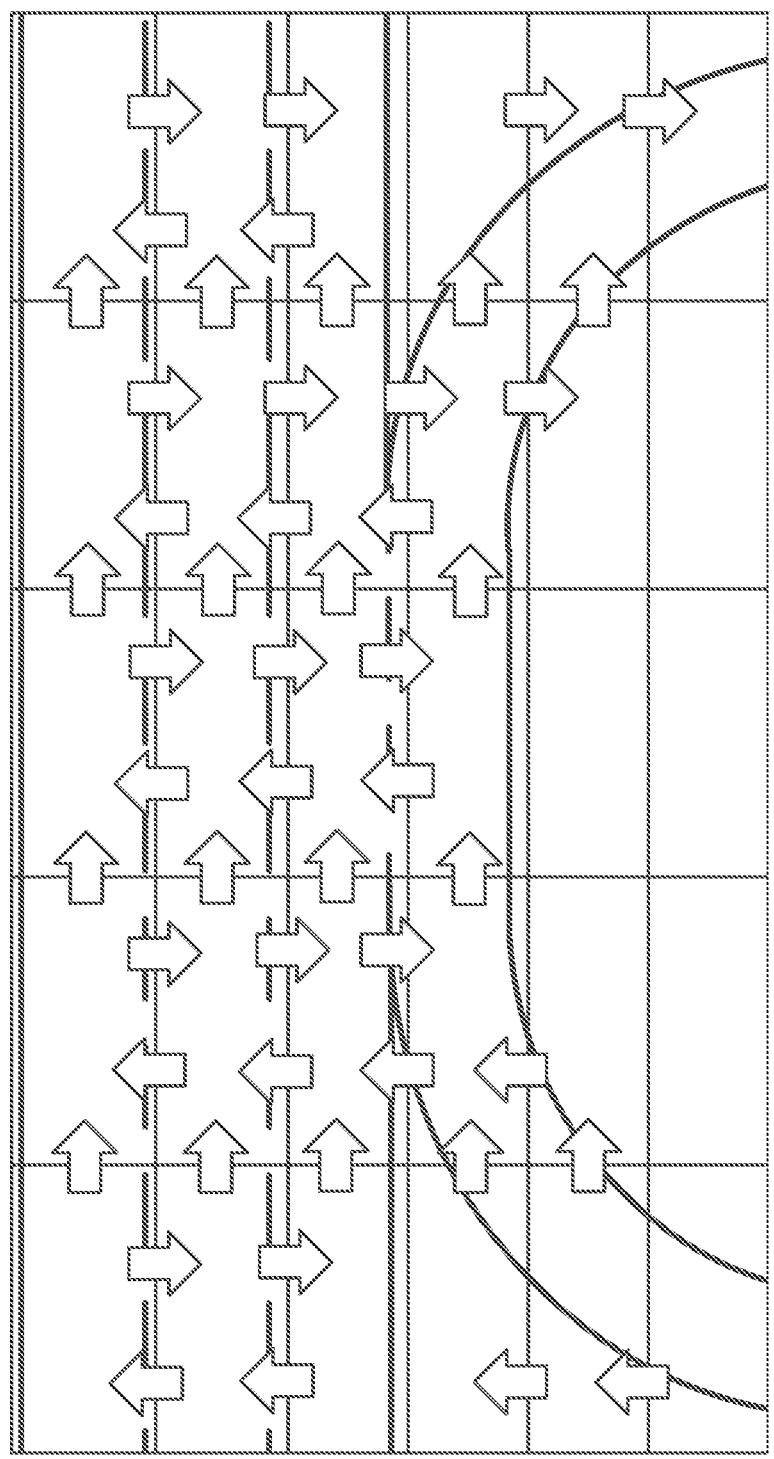
FIG. 5 is a diagram of one example of an unweighted lane segment graph, in accordance with some implementations.

FIG. 4 is a flow diagram of one example of a method 400 for driving trajectory planning of the automated vehicle 100. At block 402, a lane segment graph is determined (for example, by the electronic processor 122). FIG. 5 is one example of a lane segment graph for the driving scene illustrated in FIG. 2. The lane segment graph divides the road in a plurality of lane segments that are overlaid on top of the roadway. The lane segment graph indicates allowable transitions between the plurality of lane segments. For example, the lane segment graph illustrated in FIG. 5 indicates allowable transition between the plurality of lane segments with arrows. In some implementations, the electronic processor 122 is configured to determine the lane segment graph via a navigation system (for example, the GNSS receiver 119). For example, the GNSS receiver 119 determines a location of the automated vehicle 100 using global positioning system (GPS) coordinates and the electronic processor 122 uses the determined GPS coordinates to receive a map of the roadway around the automated vehicle 100 from a map supplier via the transceiver 116. In some implementations, the electronic processor 122 is configured to determine the lane segment graph by receiving the lane segment graph from an external source. For example, the electronic processor 122 determines a location of the automated vehicle 100, sends the determined location (and potentially additional information such as lateral driving direction) to a remote server, and responsively receives the lane segment graph from the remote server.

At block 404, a current type of traffic flow situation is determined (for example, by the electronic processor 122). The current type of traffic flow situation represents the current amount of traffic flowing through a roadway. Some examples of types of traffic flow situations include a dense traffic flow situation and a light traffic flow situation, as well as other traffic flow amounts on a spectrum of traffic flow situations. In some implementations, the current type of traffic flow situation represents the current amount of traffic flowing through the plurality of lane segments included in the lane segment graph. Alternatively, or in addition, the current type of traffic flow situation represents the current amount of traffic flowing near the plurality of lane segments included in the lane segment graph. For example, with respect to the driving scene illustrated in FIG. 2, the current type of traffic flow situation may represent the current amount of traffic flowing on the highway that the second vehicle 204 is traveling on.

In some implementations, the electronic processor 122 is configured to determine the current type of traffic flow situation based at least in part on the current time. For example, the electronic processor 122 may determine a dense traffic flow situation when the current time is within a historically observed rush hour period. As a further example, the electronic processor 122 may determine a light traffic flow situation when the current time is outside historically observed rush hour periods. In some implementations, alternatively, or in addition, to using the current time of day, the electronic processor 122 is configured to determine the current type of traffic flow situation based at least in part on the current day of the week. For example, the electronic processor 122 may determine a dense traffic flow situation when the current day of the week is a weekday and the current time is within a historically observed rush hour period for weekdays. As a further example, the electronic processor 122 may determine a light traffic flow situation when the current day of the week is a weekend and the current time is within a historically observed non-rush hour period for weekdays. In some implementations, alternatively, or in addition, to using the current time of day and the current day of the week, the electronic processor 122 is configured to determine the current type of traffic flow situation based at least in part on the current date. For example, the electronic processor 122 may determine a dense traffic flow situation when the current day of the week of the week is Friday, the current date is a day before a three-day weekend, and the current time is within a historically observed rush hour period for three-day weekends (for example, its 3:00 PM on a Friday before memorial day weekend). As a further example, the electronic processor 122 may determine a light traffic flow situation when the current day of the week is a weekday, the current time is within a historically observed rush hour period for weekdays, and the current date is a national holiday when most businesses are closed (for example, labor day).

In some implementations, the electronic processor 122 is configured to determine the current type of traffic flow situation based on real-time traffic data received, for example, via the transceiver 116. The real-time traffic data indicates, for example, the average speed of vehicles passing through a portion of a road and the electronic processor 122 is configured to determine the current type of traffic flow situation based on the average speed. For example, the electronic processor 122 may determine a dense traffic flow when the average speed is greater than a threshold and determine a light traffic flow situation when the average speed is less than or equal to the threshold. As another example, the real-time traffic data may indicate real-time positions of neighboring vehicles in the roadway. Alternatively, or in addition, the real-time traffic data indicates real-time positions (for example, GPS coordinates) of neighboring vehicles in the roadway. For example, the electronic processor 122 may determine a dense traffic flow when more than a threshold quantity of neighboring vehicles are positioned in the roadway and determine a light traffic flow situation when less than or equal to the threshold quantity of neighboring vehicles are positioned in the roadway. In some implementations, the electronic processor 122 is configured to receive real-time traffic data via the transceiver 116 from neighboring vehicles, a remote sever, or both. Real-time traffic data may include, for example, real-time construction information and real-time crash information.

In some implementations, the electronic processor 122 is configured to determine the current type of traffic flow situation based on position data of neighboring vehicles in the roadway captured, for example, by the one or more vehicle sensors 118. For example, a camera included in some implementations of the one or more vehicle sensors 118 may capture images of neighboring vehicles positioned on the roadway and the electronic processor 122 is configured to determine the current type of traffic flow situation based on the quantity of neighboring vehicles included in the captured images. As a further example, radar sensors included in some implementations of the one or more vehicle sensors 118 may detect the presence of neighboring vehicles positioned on the roadway and the electronic processor 122 is configured to determine the current type of traffic flow situation based on the quantity of neighboring vehicles detected by the radar sensors.

Returning to FIG. 4, at block 406, weighting factors for each of the allowable transitions in the lane segment graph are determined (for example, by the electronic processor 122). The weighting factors provide contextual information regarding likely (for example, expected) transitions that neighboring vehicles will execute, and what common actions human drivers in the same driving situation as the current driving situation have taken in the past. Each of the weighting factors indicate a likelihood of transition for a respective one of the allowable transitions in the lane segment graph. For example, a first weighting factor may indicate a low likelihood of transition for a first allowable transition from a first lane segment to a second lane segment, and a second weighting factor may indicate a high likelihood of transition for a second allowable transition from the second lane segment to the first lane segment.

The electronic processor 122 is configured to determine weighting factors based on aggregate observations of previous real-world traffic flow situations for the current type of traffic flow situation. For example, aggregate observations may indicate that an allowable transition from one lane segment to another lane segment is made many times during dense traffic flow and is made few times during light traffic flow. In some implementations, the electronic processor 122 is configured to receive data stored in the memory 124 that indicates aggregate observations of different previous real-world traffic flow situations. Alternatively, or in addition, the electronic processor 122 is configured to receive data indicating aggregate observations of different previous real-world traffic flow situations via the transceiver 116 from an external source. For example, the electronic processor 122 receives data via the transceiver 116 from a database stored in a remote server. In some implementations, the aggregate observations are frequently updated, for example, through a centralized traffic data aggregation system. For example, the aggregate observations are updated to reflect new traffic patterns. In some implementations, the aggregate observations incorporate regional driving behaviors.

Figure 6:
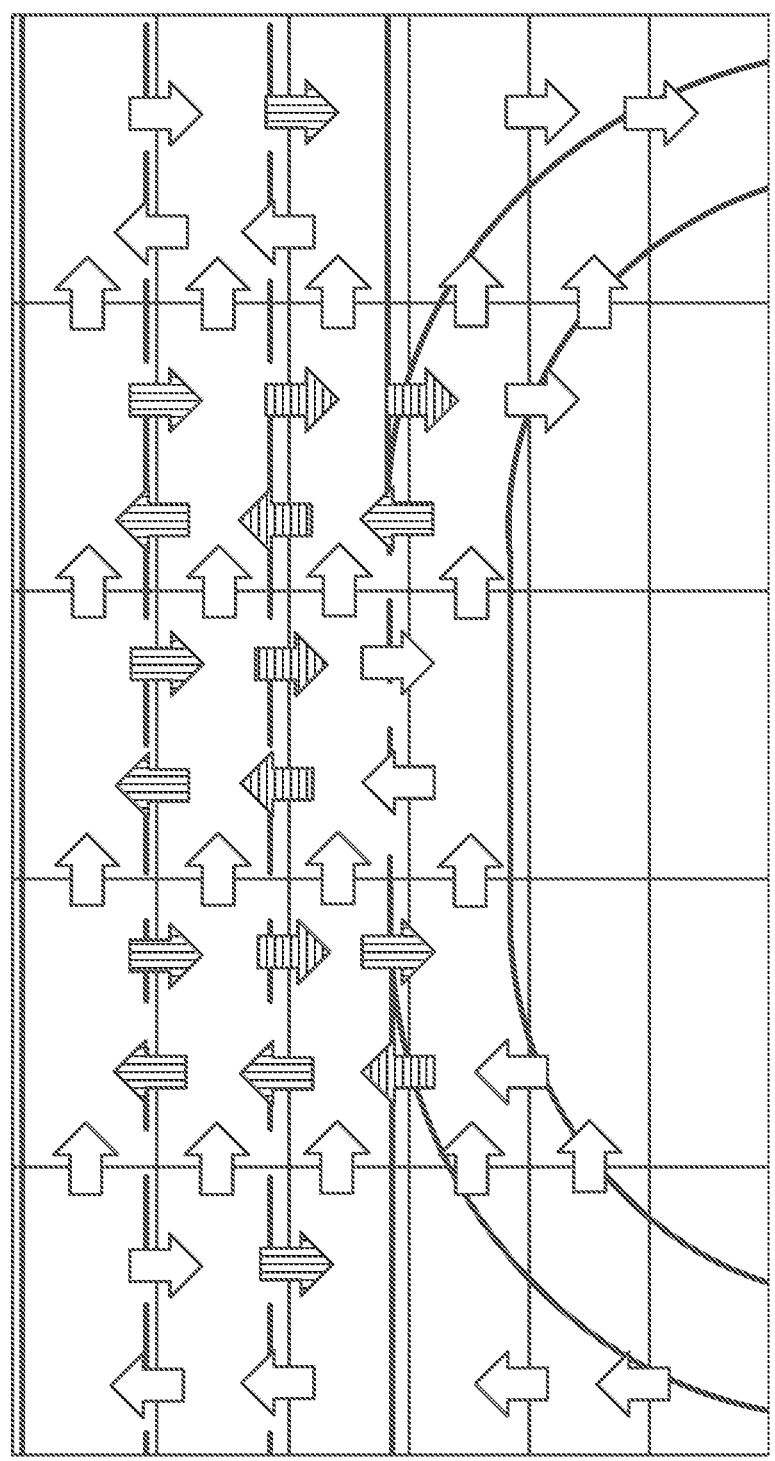
FIG. 6 is a diagram of one example of a weighted lane segment graph for a dense traffic flow situation, in accordance with some implementations.

At block 408, a weighted lane segment graph is determined based at least in part on the weighting factors determined at block 406. FIG. 6 is one example of a weighted lane segment graph for the driving scene illustrated in FIG. 2 during a period of dense traffic. In FIG. 6, the weighting of the arrows is indicated by shading. The arrows in FIG. 6 without shading represent commonly executed transitions. The arrows in FIG. 6 with horizontal shading represent somewhat common transitions. The arrows in FIG. 6 with vertical shading represent rarely executed transitions.

At block 410, a driving trajectory of the automated vehicle 100 is determined (for example, by the electronic processor 122) based at least in part on the weighted lane segment graph. In some implementations, as used here, the term "trajectory" solely defines a path for a vehicle and does not require the traversal of the path in time. In other implementations, as used here, the term "trajectory" defines both a path for a vehicle and how the vehicle traverses through the path in time at one or more target speeds. For example, with reference to FIG. 3, the driving trajectory may include a driving route along the predicted states for the first vehicle 202, a target speed of 30 miles per hour (MPH) at future time t=1, a target speed of 35 MPH at future time t=2, a target speed of 45 MPH at future time t=3, and a target speed of 55 MPH at future time t=4. Alternatively, or in addition, the driving trajectory of the automated vehicle 100 includes, for example, a specific type of lane change for the automated vehicle 100 (for example, changing from an overtaking lane to a slow lane), a single speed target for the automated vehicle 100, or a combination thereof.

In some implementations, the electronic processor 122 is configured to use the weighted lane segment graph to determine a predicted trajectory of a neighboring vehicle, and then use the predicted trajectory of the neighboring vehicle to determine a driving trajectory of the automated vehicle 100. As a first example, when the current type of traffic situation is dense traffic flow, the electronic processor 122 may apply the weighted lane segment graph illustrated in FIG. 5 to the driving scene illustrated in FIG. 2 to determine a predicted trajectory of the neighboring vehicle (i.e., second vehicle 204).

Figure 7:
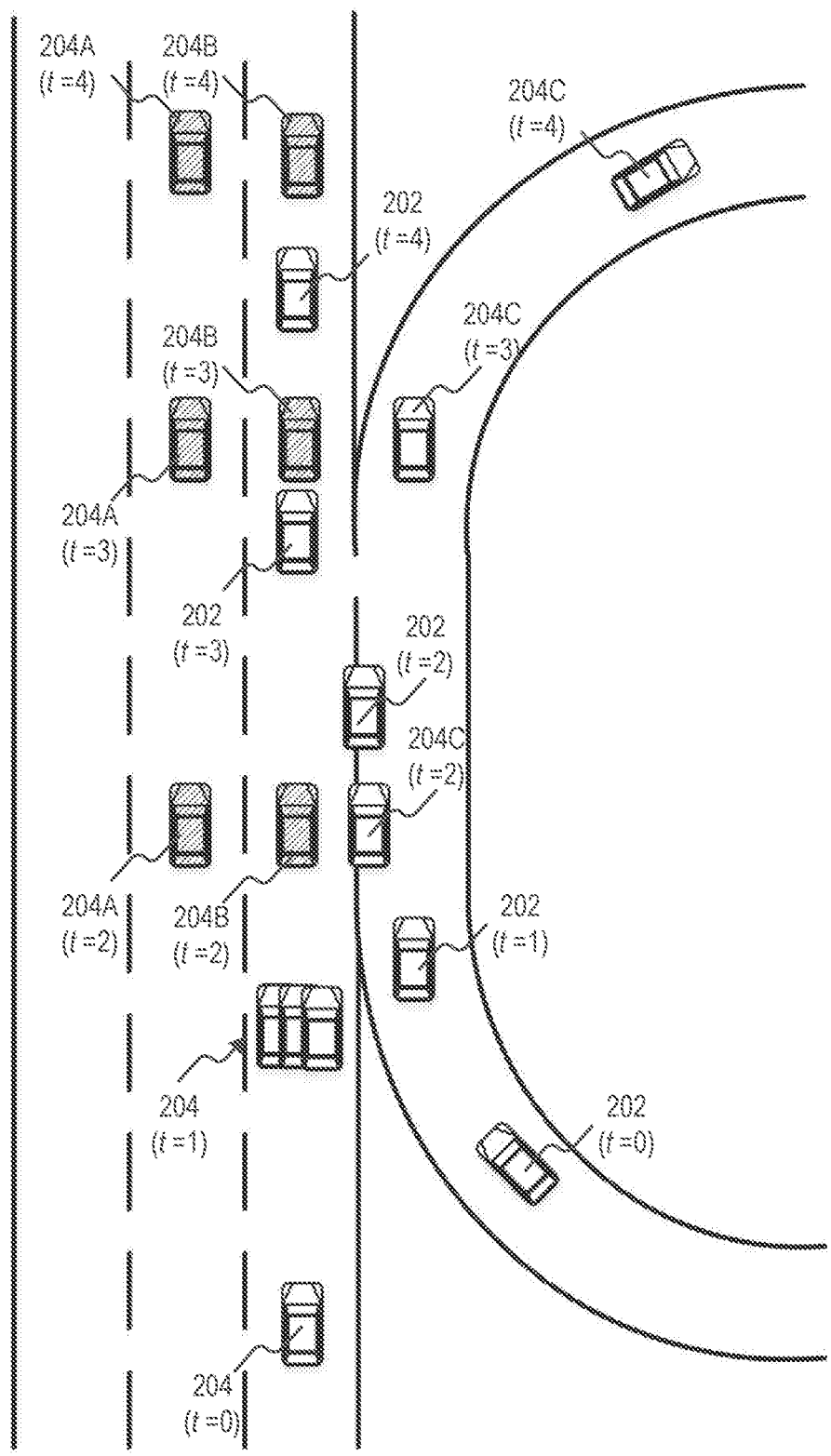
FIG. 7 is a diagram of one example of a predicted evolution of the driving scene illustrated in FIG. 2 for a dense traffic flow situation, in accordance with some implementations.

FIG. 7 illustrates one example of a predicted evolution of the driving scene illustrated in FIG. 2 from the perspective of the first vehicle 202 being the automated vehicle 100 and the second vehicle 204 being a neighboring vehicle. The electronic processor 122 is configured to predict future states of both the first vehicle 202 and the second vehicle 204. The t=n portion of the reference labels in FIG. 7 represent the states of the first vehicle 202 and the second vehicle 204 at future time n. As illustrated in FIG. 7, the second vehicle 204 has numerous potential driving paths which result in three resultant states which are indicated by reference characters 204A, 204B, and 204C, respectively. Note that FIG. 7 only illustrates the expansion of possible trajectories at time t=0. Possible trajectories can be further expanded at any time step. The uncertainty of the state of the second vehicle 204 is illustrated in FIG. 7 by shading, with shading indicating high confidence in the predicted state and the lack of shading indicating low confidence in the predicted state. As illustrated in FIG. 7, the predicted trajectory of the second vehicle 204 with the highest confidence indicates that the second vehicle 204 will most likely exit at the ramp. Based at least in part on the predicted trajectory of the second vehicle 204, the electronic processor 122 may determine a driving trajectory for the first vehicle 202 to enter the highway without colliding with (or obstructing the predicted trajectory of) the second vehicle 204. For example, the electronic processor 122 may determine a driving trajectory in which the first vehicle 202 slows down to allow the second vehicle 204 to exit in front of the first vehicle 202 at the ramp.

Figure 8:
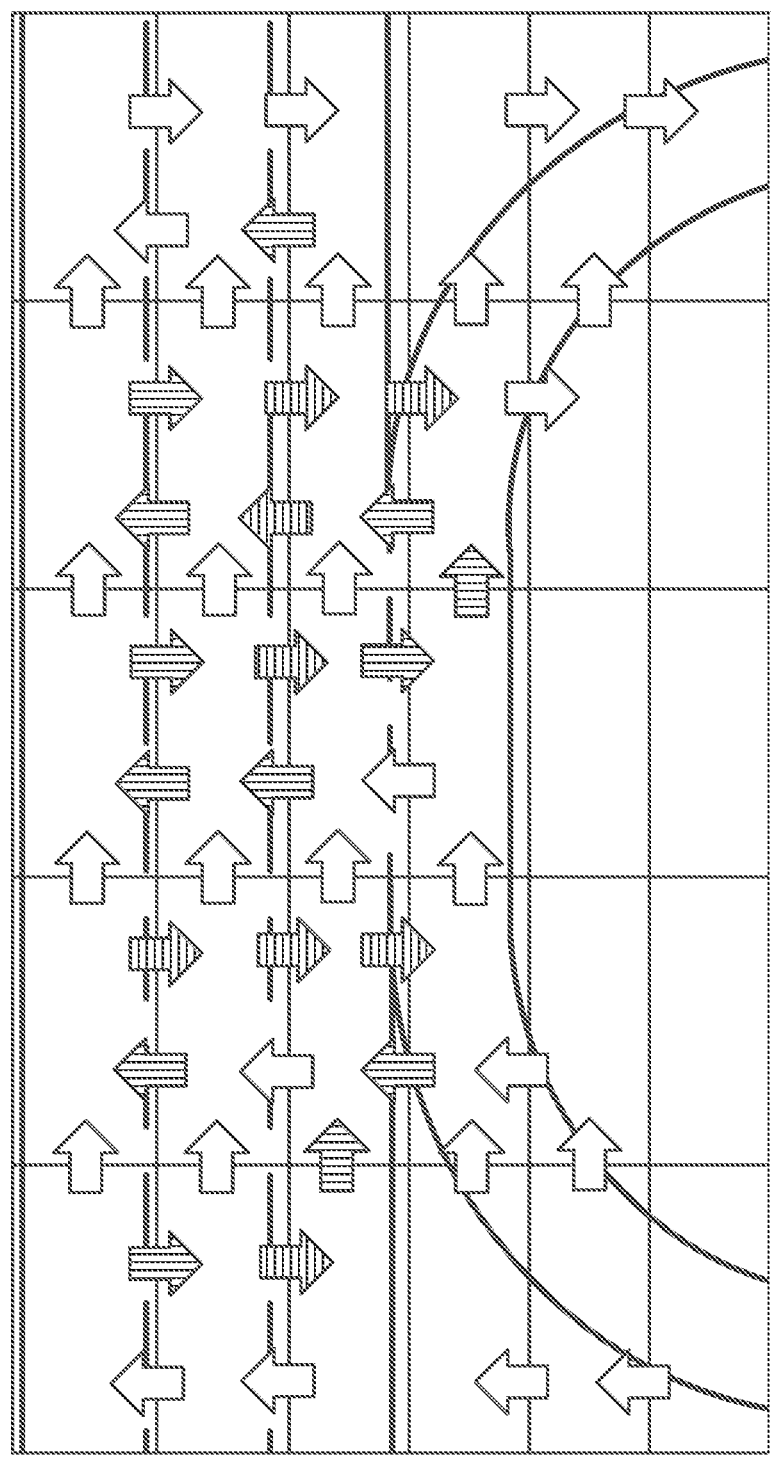
FIG. 8 is a diagram of one example of a weighted lane segment graph for a light traffic flow situation, in accordance with some implementations.

As a second example, when the current type of traffic situation is light traffic flow, the electronic processor 122 may apply the weighted lane segment graph illustrated in FIG. 8 to the driving scene illustrated in FIG. 2 to determine a predicted trajectory of the neighboring vehicle (i.e., second vehicle 204). FIG. 8 is one example of a weighted lane segment graph for the traffic scene illustrated in FIG. 2 during a period of light traffic. In FIG. 8, the weighting of the arrows is indicated by shading. The arrows in FIG. 8 without shading represent commonly executed transitions. The arrows in FIG. 8 with horizontal shading represent somewhat common transitions. The arrows in FIG. 8 with vertical shading represent rarely executed transitions.

Figure 9:
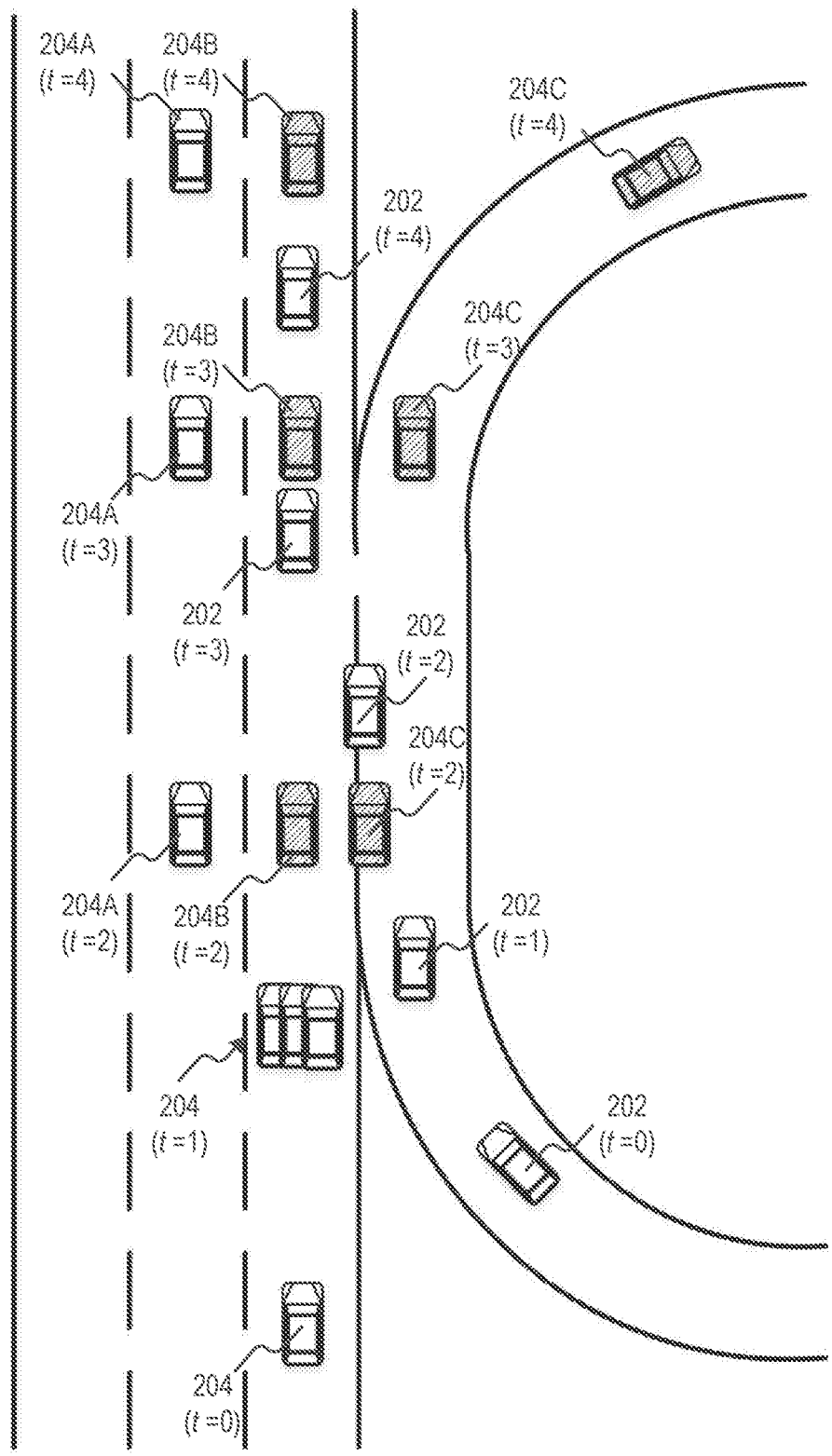
FIG. 9 is a diagram of one example of a predicted evolution of the driving scene illustrated in FIG. 2 for a light traffic flow situation, in accordance with some implementations.

FIG. 9 illustrates one example of a predicted evolution of the driving scene illustrated in FIG. 2 again from the perspective of the first vehicle 202 being the automated vehicle 100 and the second vehicle 204 being a neighboring vehicle. The electronic processor 122 is configured to predict future states of both the first vehicle 202 and the second vehicle 204. The t=n portion of the reference labels in FIG. 9 represent the states of the first vehicle 202 and the second vehicle 204 at future time n. As illustrated in FIG. 9, the second vehicle 204 has numerous potential driving paths which result in three resultant states which are indicated by reference characters 204A, 204B, and 204C, respectively. Note that FIG. 8 only illustrates the expansion of possible trajectories at time t=0. Possible trajectories can be further expanded at any time step. The uncertainty of the state of the second vehicle 204 is illustrated in FIG. 9 by shading, with shading indicating high confidence in the predicted state and the lack of shading indicating low confidence in the predicted state. As illustrated in FIG. 9, the predicted trajectory of the second vehicle 204 with the highest confidence indicates that the second vehicle 204 will most likely to change lanes to give space for the first vehicle 202 to merge onto the highway. Based at least in part on the predicted trajectory of the second vehicle 204, the electronic processor 122 may determine a driving trajectory for the first vehicle 202 to enter the highway. For example, the electronic processor 122 may determine a driving trajectory in which the first vehicle 202 does not slow down because the path for the first vehicle 202 to merge onto the highway is clear.

In some implementations, the electronic processor 122 is configured to use the weighted lane segment graph to determine a driving trajectory for the automated vehicle 100 that imitates common courteous behaviors of human drivers. For example, most countries have a notion of an overtaking lane and a slow lane when driving on highways. Thus, in some implementations, the electronic processor 122 is configured to select between an overtaking lane and a slow lane based at least in part on the weighted lane segment graph. For example, when the current type of traffic flow situation is a light traffic flow situation, the weighted lane segment graph may indicate that most vehicles occupy the slow lane. Thus, the electronic processor 122 may determine a driving trajectory of the automated vehicle 100 that primarily includes the slow lane.

In some implementations, the electronic processor 122 selects from a set of available lanes on a roadway based at least in part on the weighted lane graph segment. For example, as described above and illustrated in FIG. 9, yielding via changing lanes to provide space to a vehicle entering a highway is another example of common courteous behavior of human drivers. Thus, in some implementations, the electronic processor 122 selects between an outermost lane and a lane adjacent to the outermost lane on a highway based at least in part on the weighted lane segment graph. For example, looking at the driving scene illustrated in FIG. 2 from the perspective of the second vehicle 204 being the automated vehicle 100 and the first vehicle 202 being the neighboring vehicle, a driving trajectory determined for the second vehicle 204 using the weighted lane segment graph may include changing lanes from the rightmost non-exit/entrance lane to the adjacent lane during a period of light traffic flow.

In some implementations, the electronic processor 122 is configured to take at least one action for the automated vehicle 100 based on the driving trajectory. The action may be operating various vehicle systems to navigate the automated vehicle 100 along the driving trajectory. For example, the electronic processor 122 is configured to send control signals to a propulsion system, a steering system, and a braking system of the automated vehicle 100 which cause these systems to navigate the automated vehicle 100 along the driving trajectory.

Utilizing the systems and methods described herein in automated driving systems increases the reliability and accurate tactical reasoning about what other traffic participants are likely to do in a given scenario. The systems and methods described herein also provides a manner to provide a contextualized notion of courtesy for automated driving systems. Courteous automated driving improves driver trust and comfort with automated driving systems as well as improves safety and quality metrics because, among other things, the automated driving system is driving in a more human-like and courteous manner.

Various aspects of the disclosure may take any one or more of the following exemplary configurations.

EEE(1) A system for driving trajectory planning of an automated vehicle, the system comprising: an electronic processor configured to determine a lane segment graph indicating allowable transitions between a plurality of lane segments, determine a current type of traffic flow situation, determine weighting factors for each of the allowable transitions based on aggregate observations of previous real-world traffic flow transitions for the current type of traffic flow situation, each of the weighting factors indicating a likelihood of transition for a respective one of the allowable transitions, determine a weighted lane segment graph based at least in part on the weighting factors, and determine a driving trajectory of the automated vehicle based at least in part on the weighted lane segment graph.

EEE(2) The system of EEE(1), wherein the electronic processor is further configured to: detect a neighboring vehicle located in one of the plurality of lane segments, determine a predicted trajectory of the neighboring vehicle based at least in part on the weighted lane segment graph, and determine the driving trajectory of the automated vehicle based at least in part on the weighted lane segment graph and the predicted trajectory of the neighboring vehicle.

EEE(3) The system of EEE(1) or EEE(2), wherein the electronic processor is further configured to determine the current type of traffic flow situation based at least in part at least one selected from the group consisting of a current time, a current day of the week, and a current date.

EEE(4) The system of any one of EEE(1) to EEE(3), further comprising a transceiver communicably coupled to the electronic processor, wherein the electronic processor is further configured to: receive real-time traffic data via the transceiver, and determine the current type of traffic flow situation based at least in part on the real-time traffic data.

EEE(5) The system of any one of EEE(1) to EEE(4), further comprising one or more vehicle sensors physically coupled to the automated vehicle and communicably coupled to the electronic processor, wherein the one or more vehicle sensors are configured to capture position data of one or more neighboring vehicles, wherein the electronic processor is further configured to determine the current type of traffic flow situation based at least in part on the position data of the one or more neighboring vehicles.

EEE(6) The system of any one of EEE(1) to EEE(5), wherein the current type of traffic flow situation includes at least one selected from the group consisting of a dense traffic flow situation and a light traffic flow situation.

EEE(7) The system of any one of EEE(1) to EEE(6), wherein, to determine the driving trajectory of the automated vehicle based at least in part on the weighted lane segment graph, the electronic processor is further configured to select from a set of available lanes on a roadway based at least in part on the weighted lane segment graph.

EEE(8) The system of any one of EEE(1) to EEE(7), wherein, to determine the driving trajectory of the automated vehicle based at least in part on the weighted lane segment graph, the electronic processor is further configured to select between an overtaking lane and a slow lane based at least in part on the weighted lane segment graph.

EEE(9) The system of any one of EEE(1) to EEE(8), wherein the driving trajectory of the automated vehicle includes a driving route for the automated vehicle to navigate and a plurality of target speeds for the automated vehicle at different points along the driving route.

EEE(10) The system of any one of EEE(1) to EEE(9), wherein the electronic processor is further configured to take at least one action for the automated vehicle based on the driving trajectory.

EEE(11) A method for driving trajectory planning of an automated vehicle, the method comprising: determining, with an electronic processor, a lane segment graph indicating allowable transitions between a plurality of lane segments; determining, with the electronic processor, a current type of traffic flow situation; determining, with the electronic processor, weighting factors for each of the allowable transitions based on aggregate observations of previous real-world traffic flow transitions for the current type of traffic flow situation, each of the weighting factors indicating a likelihood of transition for a respective one of the allowable transitions; determining, with the electronic processor, a weighted lane segment graph based at least in part on the weighting factors; and determining, with the electronic processor, a driving trajectory of the automated vehicle based at least in part on the weighted lane segment graph.

EEE(12) The method of EEE(11), further comprising: detecting, with the electronic processor, a neighboring vehicle located in one of the plurality of lane segments; determining, with the electronic processor, a predicted trajectory of the neighboring vehicle based at least in part on the weighted lane segment graph; and determining, with the electronic processor, the driving trajectory of the automated vehicle based at least in part on the weighted lane segment graph and the predicted trajectory of the neighboring vehicle.

EEE(13) The method of EEE(11) or EEE(12), further comprising, determining, with the electronic processor, the current type of traffic flow situation based at least in part on at least one selected from the group consisting of a current time, a current day of the week, and a current date.

EEE(14) The method of any one of EEE(11) to EEE(13), further comprising: receiving, at the electronic processor, real-time traffic data via a transceiver, wherein the transceiver is communicably coupled to the electronic processor; and determining, with the electronic processor, the current type of traffic flow situation based at least in part on the real-time traffic data.

EEE(15) The method of any one of EEE(11) to EEE(14), furthering comprising: capturing position data of one or more neighboring vehicles with one or more vehicle sensors, wherein the one or more vehicle sensors are physically coupled to the automated vehicle and communicably coupled to the electronic processor; and determining, with the electronic processor, the current type of traffic flow situation based at least in part on the position data of the one or more neighboring vehicles.

EEE(16) The method of any one of EEE(11) to EEE(15), wherein the current type of traffic flow situation includes at least one selected from the group consisting of a dense traffic flow situation and a light traffic flow situation.

EEE(17) The method of any one of EEE(11) to EEE(16), wherein determining, with the electronic processor, the driving trajectory of the automated vehicle based at least in part on the weighted lane segment graph includes selecting, with the electronic processor, from a set of available lanes on a roadway based at least in part on the weighted lane segment graph.

EEE(18) The method of any one of EEE(11) to EEE(17), wherein determining, with the electronic processor, the driving trajectory of the automated vehicle based at least in part on the weighted lane segment graph includes selecting, with the electronic processor, between an overtaking lane and a slow lane based at least in part on the weighted lane segment graph.

EEE(19) The method of any one of EEE(11) to EEE(18), wherein the driving trajectory of the automated vehicle includes a driving route for the automated vehicle to navigate and a plurality of target speeds for the automated vehicle at different points along the driving route.

EEE(20) The method of any one of EEE(11) to EEE(19), further comprising taking, with the electronic processor, at least one action for the automated vehicle based on the driving trajectory.

Thus, the disclosure provides, among other things, systems and methods for driving trajectory planning of an automated vehicle. Various features and advantages are set forth in the following claims.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the disclosure.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for driving trajectory planning of an automated vehicle, the system comprising:
   an electronic processor configured to
      determine a lane segment graph indicating allowable transitions between a plurality of lane segments,
      determine a current type of traffic flow situation,
      determine weighting factors for each of the allowable transitions based on aggregate observations of previous real-world traffic flow transitions for the current type of traffic flow situation, each of the weighting factors indicating a likelihood of transition for a respective one of the allowable transitions,
      determine a weighted lane segment graph based at least in part on the weighting factors, and
      determine a driving trajectory of the automated vehicle based at least in part on the weighted lane segment graph.

2. The system of claim 1, wherein the electronic processor is further configured to:
   detect a neighboring vehicle located in one of the plurality of lane segments,
   determine a predicted trajectory of the neighboring vehicle based at least in part on the weighted lane segment graph, and
   determine the driving trajectory of the automated vehicle based at least in part on the weighted lane segment graph and the predicted trajectory of the neighboring vehicle.

3. The system of claim 1, wherein the electronic processor is further configured to determine the current type of traffic flow situation based at least in part on at least one selected from the group consisting of a current time, a current day of the week, and a current date.

4. The system of claim 1, further comprising a transceiver communicably coupled to the electronic processor, wherein the electronic processor is further configured to:
   receive real-time traffic data via the transceiver, and
   determine the current type of traffic flow situation based at least in part on the real-time traffic data.

5. The system of claim 1, further comprising one or more vehicle sensors physically coupled to the automated vehicle and communicably coupled to the electronic processor, wherein the one or more vehicle sensors are configured to capture position data of one or more neighboring vehicles, wherein the electronic processor is further configured to determine the current type of traffic flow situation based at least in part on the position data of the one or more neighboring vehicles.

6. The system of claim 1, wherein the current type of traffic flow situation includes at least one selected from the group consisting of a dense traffic flow situation and a light traffic flow situation.

7. The system of claim 1, wherein, to determine the driving trajectory of the automated vehicle based at least in part on the weighted lane segment graph, the electronic processor is further configured to select from a set of available lanes on a roadway based at least in part on the weighted lane segment graph.

8. The system of claim 1, wherein, to determine the driving trajectory of the automated vehicle based at least in part on the weighted lane segment graph, the electronic processor is further configured to select between an overtaking lane and a slow lane based at least in part on the weighted lane segment graph.

9. The system of claim 1, wherein the driving trajectory of the automated vehicle includes a driving route for the automated vehicle to navigate and a plurality of target speeds for the automated vehicle at different points along the driving route.

10. The system of claim 1, wherein the electronic processor is further configured to take at least one action for the automated vehicle based on the driving trajectory.

11. A method for driving trajectory planning of an automated vehicle, the method comprising:
    determining, with an electronic processor, a lane segment graph indicating allowable transitions between a plurality of lane segments;
    determining, with the electronic processor, a current type of traffic flow situation;
    determining, with the electronic processor, weighting factors for each of the allowable transitions based on aggregate observations of previous real-world traffic flow transitions for the current type of traffic flow situation, each of the weighting factors indicating a likelihood of transition for a respective one of the allowable transitions;
    determining, with the electronic processor, a weighted lane segment graph based at least in part on the weighting factors; and
    determining, with the electronic processor, a driving trajectory of the automated vehicle based at least in part on the weighted lane segment graph.

12. The method of claim 11, further comprising:
    detecting, with the electronic processor, a neighboring vehicle located in one of the plurality of lane segments;
    determining, with the electronic processor, a predicted trajectory of the neighboring vehicle based at least in part on the weighted lane segment graph; and
    determining, with the electronic processor, the driving trajectory of the automated vehicle based at least in part on the weighted lane segment graph and the predicted trajectory of the neighboring vehicle.

13. The method of claim 11, further comprising, determining, with the electronic processor, the current type of traffic flow situation based at least in part on at least one selected from the group consisting of a current time, a current day of the week, and a current date.

14. The method of claim 11, further comprising:
receiving, at the electronic processor, real-time traffic data via a transceiver, wherein the transceiver is communicably coupled to the electronic processor; and
determining, with the electronic processor, the current type of traffic flow situation based at least in part on the real-time traffic data.

15. The method of claim 11, furthering comprising:
capturing position data of one or more neighboring vehicles with one or more vehicle sensors, wherein the one or more vehicle sensors are physically coupled to the automated vehicle and communicably coupled to the electronic processor; and
determining, with the electronic processor, the current type of traffic flow situation based at least in part on the position data of the one or more neighboring vehicles.

16. The method of claim 11, wherein the current type of traffic flow situation includes at least one selected from the group consisting of a dense traffic flow situation and a light traffic flow situation.

17. The method of claim 11, wherein determining, with the electronic processor, the driving trajectory of the automated vehicle based at least in part on the weighted lane segment graph includes selecting, with the electronic processor, from a set of available lanes on a roadway based at least in part on the weighted lane segment graph.

18. The method of claim 11, wherein determining, with the electronic processor, the driving trajectory of the automated vehicle based at least in part on the weighted lane segment graph includes selecting, with the electronic processor, between an overtaking lane and a slow lane based at least in part on the weighted lane segment graph.

19. The method of claim 11, wherein the driving trajectory of the automated vehicle includes a driving route for the automated vehicle to navigate and a plurality of target speeds for the automated vehicle at different points along the driving route.

20. The method of claim 11, further comprising taking, with the electronic processor, at least one action for the automated vehicle based on the driving trajectory.

* * * * *